US012643506B2

(12) United States Patent
Selanders et al.

(10) Patent No.: US 12,643,506 B2
(45) Date of Patent: Jun. 2, 2026

(54) APPARATUS FOR SUPPORTING VEHICLE, JACK RETROFIT SYSTEM, AND METHODS OF USE THEREOF

(71) Applicant: Origen RV Accessories, Ltd., Calgary (CA)

(72) Inventors: Mark Jeffrey Selanders, Langdon (CA); Devon Wilson, Calgary (CA)

(73) Assignee: ORIGEN RV ACCESSORIES, LTD., Calgary (CA)

( * ) Notice: Subject to any disclaimer, the term of this patent is extended or adjusted under 35 U.S.C. 154(b) by 414 days.

(21) Appl. No.: 18/347,505

(22) Filed: Jul. 5, 2023

(65) Prior Publication Data

US 2024/0208467 A1     Jun. 27, 2024

Related U.S. Application Data

(63) Continuation-in-part of application No. 29/869,117, filed on Dec. 21, 2022, now abandoned.

(60) Provisional application No. 63/487,557, filed on Feb. 28, 2023.

(51) Int. Cl.
B60S 9/02          (2006.01)

(52) U.S. Cl.
CPC ....................................... B60S 9/02 (2013.01)

(58) Field of Classification Search
CPC ......................................................... B60S 9/02
See application file for complete search history.

(56) References Cited

U.S. PATENT DOCUMENTS

| | | | |
|---|---|---|---|
| 2,221,203 A | | 11/1940 | Sandberg |
| 3,219,362 A | * | 11/1965 | Epstein ..................... B60S 9/02 |
| | | | 267/153 |
| 4,073,454 A | | 2/1978 | Sauber |
| 4,254,927 A | * | 3/1981 | Stonhaus ................ B66F 13/00 |
| | | | 248/912 |
| 4,461,491 A | | 7/1984 | Eklund |
| 4,577,828 A | * | 3/1986 | Drucker .................. F24F 13/32 |
| | | | 248/678 |
| 4,634,144 A | * | 1/1987 | Ringe ........................ B60S 9/02 |
| | | | 254/419 |

(Continued)

FOREIGN PATENT DOCUMENTS

| | | | |
|---|---|---|---|
| GB | 1387347 A | 3/1975 | |
| GB | 2352699 A | * 2/2001 | ................ B60S 9/02 |

(Continued)

OTHER PUBLICATIONS

"Mini Square 5 4-Pack—RV SnapPad"; The reference includes the archived SnapPad Mini-Square 5 4-Pack web page listing from Oct. 20, 2020 pulled on Jul. 30, 2025 and the SnapPad Mini-Square 5 4-Pack web page listing pulled Aug. 1, 2025; https://rvsnappad. com/products/mini-square-5-4-pack (10 pages).

(Continued)

*Primary Examiner* — Jacob B Meyer
(74) *Attorney, Agent, or Firm* — ArentFox Schiff LLP

(57)          ABSTRACT
A system, and device for supporting a vehicle, the system may include a substantially rigid pad bracket and include a jack pad configured to engageably connect to the pad bracket, the jack pad includes body having an upper surface and a lower surface joined by a side wall and defining a recess for retaining a portion of the pad bracket, wherein the jack pad is formed of a flexible or elastic material.

17 Claims, 9 Drawing Sheets

(56)         References Cited

U.S. PATENT DOCUMENTS

| | | | | |
|---|---|---|---|---|
| D304,575 | S | 11/1989 | Batzel | |
| 5,046,587 | A * | 9/1991 | Jones | B60T 3/00 |
| | | | | 248/346.11 |
| D347,920 | S | 6/1994 | Sell | |
| 5,419,524 | A | 5/1995 | Evans et al. | |
| 6,231,081 | B1 * | 5/2001 | Berke | B60S 9/02 |
| | | | | 254/419 |
| 6,644,615 | B1 * | 11/2003 | Liu | B66F 13/00 |
| | | | | 248/346.07 |
| 7,073,821 | B2 * | 7/2006 | Lagsdin | E02F 9/085 |
| | | | | 248/633 |
| D531,378 | S | 10/2006 | Angel et al. | |
| 7,172,216 | B1 * | 2/2007 | Lagsdin | E02F 9/085 |
| | | | | 411/401 |
| D566,731 | S | 4/2008 | Myers | |
| 7,958,967 | B2 * | 6/2011 | Lambdin | E04G 5/02 |
| | | | | 248/240.2 |
| D658,267 | S | 4/2012 | Brockington et al. | |
| 8,181,936 | B2 * | 5/2012 | Walton | F16M 11/20 |
| | | | | 248/152 |
| D668,423 | S | 10/2012 | Brockington et al. | |
| 8,814,121 | B2 * | 8/2014 | Koberg | B60S 9/02 |
| | | | | 248/910 |
| 8,998,164 | B2 * | 4/2015 | Marquardt | A47B 91/06 |
| | | | | 248/688 |
| 9,033,293 | B1 * | 5/2015 | Glenn | A47B 91/005 |
| | | | | 248/346.11 |
| 10,266,158 | B2 * | 4/2019 | Wilson | B60S 9/04 |
| 10,525,942 | B2 * | 1/2020 | Andersen | B60S 9/22 |
| 10,611,346 | B2 * | 4/2020 | Andersen | B60S 9/02 |
| 11,154,135 | B2 * | 10/2021 | Phipps | A47B 91/12 |
| D943,858 | S * | 2/2022 | Luse | D34/31 |
| D967,327 | S | 10/2022 | Aguiar et al. | |
| D1,055,197 | S | 12/2024 | Holmes et al. | |
| 12,162,733 | B2 * | 12/2024 | Ferris | B66F 13/00 |
| 12,209,378 | B2 * | 1/2025 | Perkins, II | B66C 23/78 |
| 2005/0017223 | A1 * | 1/2005 | Lucas | B66F 13/00 |
| | | | | 254/1 |
| 2009/0072525 | A1 | 3/2009 | Banks | |
| 2015/0028177 | A1 * | 1/2015 | Vargas | B60S 9/02 |
| | | | | 248/542 |
| 2019/0344760 | A1 | 11/2019 | Andersen | |
| 2021/0291718 | A1 * | 9/2021 | Thompson | B60P 3/36 |
| 2024/0025219 | A1 * | 1/2024 | Gregory | B60D 1/58 |
| 2024/0208467 | A1 * | 6/2024 | Selanders | B60S 9/02 |
| 2025/0011148 | A1 * | 1/2025 | Selanders | B66F 13/00 |
| 2025/0145438 | A1 * | 5/2025 | Brammer, Jr. | B66F 3/12 |
| 2025/0340418 | A1 * | 11/2025 | Decker, Jr. | B66F 13/00 |

FOREIGN PATENT DOCUMENTS

| | | | | |
|---|---|---|---|---|
| GB | 2361956 | A * | 11/2001 | E04G 5/02 |
| GB | 2501698 | A | 11/2013 | |
| WO | 03/064239 | A1 | 8/2003 | |

OTHER PUBLICATIONS

"212 Main BLSSP4 5.5 in. Square Mini Jack Pad-Pack of 4", Available online at <https://www.amazon.com/BL5SP4-5-5-Square-Mini-Jack/dp/B0CTLGXXC2>, 2024, pp. 1-4.

"SnapPad | EQ Stable Single for 8" Square Jack Feet | 11.5" Diameter | EQSTSP1", Available online at <https://unitedrvparts.com/products/snappad-eq-stable-single-for-8-square-jack-feet-11-5-diameter-eqstsp1>, 2024, pp. 1-7.

"SnapPad SnapJack® QD (Pack of 4) | Four-Point Trailer Jack Stands Featuring 5.5" Metal Foot | Adds 61% Additional Surface Area, 3.79 lbs. Per Pad & 7.25" Total Width | Must-Have RV Accessories", Available online at <https://www.amazon.com/dp/B0D3QPTT4L/ref=sspa_dk_detail_5?th=1>, 2024, pp. 1-8.

* cited by examiner

1

APPARATUS FOR SUPPORTING VEHICLE, JACK RETROFIT SYSTEM, AND METHODS OF USE THEREOF

CROSS-REFERENCE TO RELATED APPLICATION

This application claims priority to US Provisional Application No. 63/487,557, tiled: JACK PADS FOR SUPPORTING VEHICLE JACK FEET, filed Feb. 28, 2023, and U.S. application Ser. No. 29/869,117, titled: FOOT PAD ASSEMBLY FOR ENGAGEMENT WITH JACK, filed Dec. 21, 2022, the entirety of which are incorporated by reference herein.

TECHNICAL FIELD

Aspects of the disclosure relate generally to improved jack pads and a jack retrofit system and kit for supporting a vehicle. The disclosure further relates to methods for the manufacture of jack pads, jack retrofit systems, as well as methods for usage.

BACKGROUND

Typical recreational vehicles, motor homes, recreational vehicle transporting trailers, and travel trailers, are equipped with electric, hydraulic, and/or mechanical jacks which are lowered to the ground to lift or support the vehicle, trailer, or trailer tongue (i.e., the portion of the trailer that connects to the towing vehicle). The jacks allow the trailer to be installed on a towing vehicle, allow for storage of the vehicle, and/or provide a stable, comfortable, level living environment.

The ground below the vehicle jack may vary from gravel pads, concrete or asphalt, and soft surfaces such as grass or sand. The portion of the jack, such as a jack base, that interacts with the ground below can damage such surfaces due to the force applied to the ground when the vehicle/trailer is being supported and/or is being leveled. Sinking of the jack base into the surface on which leveling, or support is attempted not only damages the surface, but also poses a safety hazard to the user. For example, the sinking of the landing foot may cause difficulty or safety concerns with installing the vehicle onto the towing vehicle. In addition, it may be necessary to level the vehicle so that that equipment such as refrigerators and gas stoves inside the vehicle operates more efficiently and safely and/or so occupants in the vehicle experience a level living environment.

SUMMARY

The following presents a simplified summary of one or more aspects of the technology disclosed herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In some aspects of this disclosure, the techniques described herein relate to a jack pad system for connection to a jack, the jack pad system including: a substantially rigid pad bracket; a jack pad configured to engageably connect to the pad bracket, the jack pad including a body having an upper surface and a lower surface joined by a side wall and defining a recess for retaining a portion of the pad bracket, wherein the jack pad is formed of a flexible or elastic material.

In some aspects of this disclosure, the techniques described herein relate to a vehicle jack including: a substantially rigid pad bracket connected to a plurality of jack links; a jack pad configured to engageably connect to the pad bracket, the jack pad including a body having an upper surface and a lower surface joined by a side wall and defining a recess for retaining a portion of the pad bracket, wherein the jack pad is formed of a flexible or elastic material.

In some aspects of this disclosure, the techniques described herein relate to a jack pad configured to be removeably connected to a rigid pad bracket that is connected to a jack, the jack pad including: a jack pad configured to engageably connect to the pad bracket, the jack pad including a body having an upper surface and a lower surface joined by a side wall and defining a recess for retaining a portion of the pad bracket, wherein the recess is shaped to have fit-within a pad bracket interface portion of the pad bracket, wherein the jack pad is formed of a flexible or elastic material.

To the accomplishment of the foregoing and related ends, the one or more aspects of the disclosure comprise the features hereinafter fully described and particularly pointed out in the claims. The following description and the annexed drawings set forth in detail include certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

Features characteristic of aspects if the technology described herein are set forth as follows, in the appended claims, and in the drawings. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects when read in conjunction with the accompanying drawings.

DETAILED DESCRIPTION

Figure 1A:
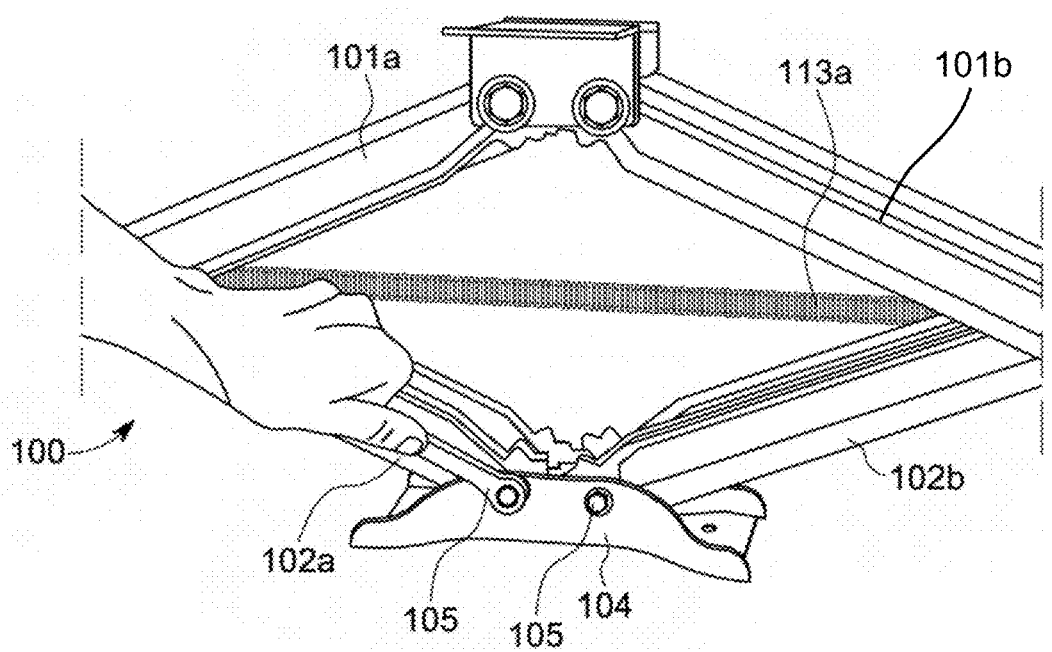
FIG. 1A illustrates a related art jack relevant to one aspect of the disclosure.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

I. Terminology

Reference throughout this specification to one aspect, an aspect, one example or an example means that a particular feature, structure or characteristic described in connection with the embodiment or example may be a feature included in at least example of the present disclosure. Thus, appearances of the phrases in one aspect, in an aspect, one example or an example in various places throughout this specification are not necessarily all referring to the same example. Furthermore, the particular features, structures or characteristics may be combined in any suitable combinations and/or subcombinations in one or more embodiments or examples.

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable level of variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the aspects or articles described herein are in an in-use orientation. In some examples, the directional terms are expressed generally with relation to a left-hand coordinate system.

Terms such as a, an, and the, are not intended to refer to only a singular entity, but also include the general class of which a specific example may be used for illustration. The terms a, an, and the, may be used interchangeably with the term at least one. The phrases at least one of and comprises at least one of followed by a list refers to any one of the items in the list and any combination of two or more items in the list. All numerical ranges are inclusive of their endpoints and non-integer values between the endpoints unless otherwise stated.

The terms first, second, third, and fourth, among other numeric values, may be used in this disclosure. It will be understood that, unless otherwise noted, those terms are used in their relative sense only. In particular, certain components may be present in interchangeable and/or identical multiples (e.g., pairs). For these components, the designation of first, second, third, and/or fourth may be applied to the components merely as a matter of convenience in the description.

As used herein, the term vehicle refers to any type of conveyance moving on wheels including, but not limited to, a recreational vehicle such as, for example, a camper, trailer, fifth wheel, toy hauler, or motor home.

As used herein, the term support surface refers to a surface upon which the vehicle is parked including, but not limited to, even and uneven surfaces such as, for example, asphalt, concrete, rock, sand, gravel, ground, soil, vegetation, grass, and the like.

II. Overview

Recreational vehicles, motor homes, recreational vehicle transporting trailers, and travel trailers, are typically equipped with electric, hydraulic, and/or mechanical jacks (referred to broadly throughout this disclosure as a "vehicle jack"), which are lowered to the ground to lift or support the trailer to allow the trailer to be installed on a vehicle, to store the trailer, and/or to provide a stable, comfortable, level living environment. One example of a vehicle jack is located at or near a trailer tongue and or near the wheels or corners of a trailer to support and/or adjust the height a relevant portion of a trailer. The vehicle jack may have jack base that is configured to contact the ground. Since the ground below the vehicle jack and jack base may vary, the current disclosure provides examples of a jack pad, jack pad bracket, and/or a jack retrofit system or kit that is configured to provide a secure footing to prevent unwanted movement of the jack base and/or to prevent the jack base from sinking into the ground or surface below the jack base.

This overview, and the detailed description that follows, has been presented for purposes of illustration and description. It is not intended to be exhaustive nor to limit the disclosure to the forms described. Numerous modifications are possible considering the teachings herein, including any combination of the different examples described herein. Some of those modifications have been discussed and others will be understood by those skilled in the art. The various aspects were chosen and described to best illustrate the principles of the present disclosure and various aspects as are suited to the particular use contemplated. The scope of the present disclosure is, of course, not limited to the examples or aspects set forth herein but can be employed in any number of applications and equivalent devices by those of ordinary skill in the art. Rather, it is hereby intended the scope be defined by the claims appended hereto

III. Detailed Examples

The present disclosure relates to a jack pad, a jack pad bracket and a system or retrofit for a vehicle jack. The components and operation of vehicle jacks are commonly known to those skilled in the art and will not be discussed in detail. In general, the jack may be hydraulically or mechanically operated, in some instances manually be a user. In other instances, the user may be provided with a control panel such as for example, a switch panel, for operating the jack. Typical electric, hydraulic, and/or mechanical jacks are capable of being extended downwardly from the underside of the vehicle towards an underlying support surface to support the vehicle, level the vehicle, and/or for raising the vehicle for hook-up to a towing vehicle. Typically, when the vehicle is to be towed and/or driven or otherwise mobilized again, the jack feet are retracted upwardly towards the underside of the vehicle and may be folded-up, allowing the vehicle to be towed and/or for the vehicle to drive-off.

Figure 1B:
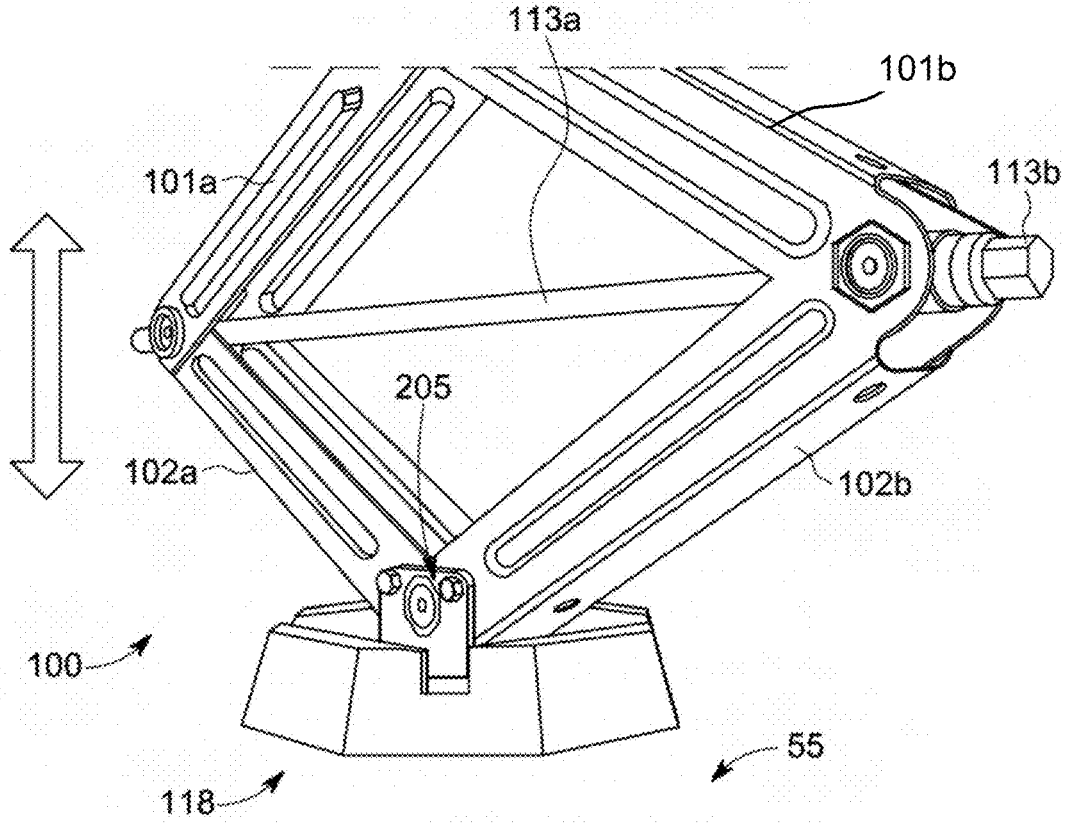
FIG. 1B illustrates the related art jack of FIG. 1A, with a retrofit according to aspects of the disclosure installed thereon.

FIG. 1A illustrates a partial view of a typical vehicle jack 100 to support a vehicle. In some examples, the vehicle jack 100, which may hereinafter be interchangeably referred to simply as a jack, can typically support a weight of between about 500 pounds ("lbs") to about 10,000 lbs or more, (the jack pads and/or bracket(s) described below were tested to 10,000 lbs). The jack shown in FIG. 1A and 1B is may be referred to in the art as a "scissor jack" and may include four or more links 101a, 101b, 102a and/or 102b that are pivotally connected to one another. The pivots between links 101a and 102a and 101b and 102b may have an interface configured to threadably engage with a shaft 113a. Rotation of the shaft 113a via the application of a rotation force to the shaft interface 113b causes the jack to move upwards or downwards as indicated by the arrows in FIG. 1B. The shaft interface 113b may be rotated manually by a user, by a hand operated drill or impact wrench and/or may have a motor connected thereto to allow for automated operation thereof. It is noted that while a scissor type jack is shown, the disclosed aspects are applicable to other known jacks as well.

As shown in FIG. 1A, the jack 100 may further include a jack base 104 that is connected to the links 102a and 102b via fasteners 105. The fasteners 105 may be through bolts that pivotally mount the links to the jack base 104. As shown in FIG. 1A and 1B, the fasteners 105 may be removed, the jack base 104 may be removed and a pad bracket 205 mounted thereto to replace the jack base 104. The pad bracket 205 may be configured to have mounted thereto or otherwise engaged with, a jack pad 118. Additional examples of pad bracket(s) and/or jack pads are described in further detail below.

FIG. 1B further illustrates a jack pad 118 and a jack pad bracket 205 according to aspects of the disclosure in an in-use position. As shown in FIG. 1B, the jack pad 118 increases surface contact patch when compared to the jack base 104 (as shown in FIG. 1A) and isolates the pad bracket 205 from a ground or surface 55. Further, as shown in FIG. 1B, when the jack base 104 is replaced with the pad bracket 205 and the jack pad 118 is installed thereon, the contact area with the surface 55 is increased which spreads the load that would typically be applied over a smaller contact area between the jack base 104 and the surface 55 over a much larger area. Further, the jack pad 118 may be formed of a flexible or semi-flexible material which provides cushioning and allows the jack pad 118 to conform to the surface 55, which stabilizes the vehicle load, especially on soft and/or uneven surfaces.

FIGS. 2-6 generally show one example of a jack pad 118 disclosed herein. FIGS. 2, 3A, 3B, and 3C show examples of the jack pad 118 installed or otherwise engaged with a pad bracket 205. The jack pad 118 (which may hereinafter be interchangeably referred to simply as a "pad") is shown generally to comprise a body with an upper surface 122 and a lower surface 124 which are joined by a number of side walls (e.g., eight side walls 126).

The upper surface 122 is substantially flat to provide a relatively planar surface. The lower surface 124 is substantially flat to provide a relatively planar surface for the pad 118 to rest on any underlying support surface (e.g., support surface 55 in FIG. 1A).

In one aspect of the disclosure, the side walls 126 are arranged in a generally octagonal configuration. Compared to a round configuration, an octagonal configuration may have less deflection and greater stiffness to withstand a load received from a jack as further described below under the heading Test Example. While an octagonal configuration is depicted, it will be appreciated by those skilled in the art that other shapes such as for example, circular, oval, square, rectangular, hexagonal, heptagonal, nonagonal, decagonal, and the like, are included within the scope of the disclosure.

The body defines an inner recess 128 (FIGS. 2 and 5) for receiving and retaining at least part of the pad bracket 205. The recess 128 may be formed in the general configuration of the pad bracket 205 and/or a pad bracket interface portion 207 (FIG. 4) to provide a snug or secure fit. It is contemplated that the size, shape, and positioning of the recess 128 for an aspect of the pad 118 may vary. Such factors relating to the recess 128 can be dictated by the dimensions of the pad bracket 205 and particularly a portion of the pad bracket that interfaces with or otherwise interacts with the pad bracket (e.g., the bracket interface portion 207 in FIG. 4).

The recess 128 is shown as substantially square-shaped and has a substantially flat or flat bottom surface 129 to receive and accommodate a similarly shaped pad bracket interface portion 207 of the pad bracket 205. For example, in some aspects, the pad bracket interface portion 207 may be a plate that is square or rectangular and thus the recess 128 may be similarly shaped so that the pad bracket interface portion 207 can fit therein. However, it will be appreciated by those skilled in the art that other shapes such as for example, oval, square, rectangular, and the like, are included within the scope of the disclosure.

In one aspect, the recess 128 can be positioned substantially in the center of the pad 118. The central positioning of the pad bracket 205 within the recess 128 can distribute loading, confer balance and stability, and prevent breakage or damage to the pad bracket 205.

In order to retain the pad bracket 205 within the recess 128, the edge 135 (FIGS. 3C and 6) of the recess 128 may be angular and/or lipped. In one aspect, a vertically extending lip 139 (FIG. 6) grips a peripheral edge 211 (FIGS. 3C and 4) of the pad bracket 205 upon insertion, which can result in a secure fit. When this fit occurs, the pad bracket 205 can be securely held within a groove 132 formed under the lip 139. The lip 139 can serve to retain the pad bracket 205 and can prevent relative movement between the pad bracket 205 and the pad 118.

In the aspects shown in FIGS. 2-3C, 5, and 6, the edge of the recess 128 is angular to define a beveled or chamfered portion. The beveled portion comprises an inclined portion 134 which extends around each side of the recess 128. In one embodiment, the beveled portion can be formed by straightly cutting off a corresponding portion of the upper surface 122 so that the thickness of the material decreases gradually towards the center of the pad 118. In one aspect, the bevel angle (e.g., an angle formed by the inclined portion 134 and an extension of a plane forming part of the upper surface 122, can range from about 30 degrees to about 65 degrees. In one aspect, the bevel angle is about 45 degrees. The beveled portion (e.g., incline portion 134) widens the recess 128 to guide the pad bracket 205 into the pad 118 to avoid pinching the lip 139.

Figure 5:
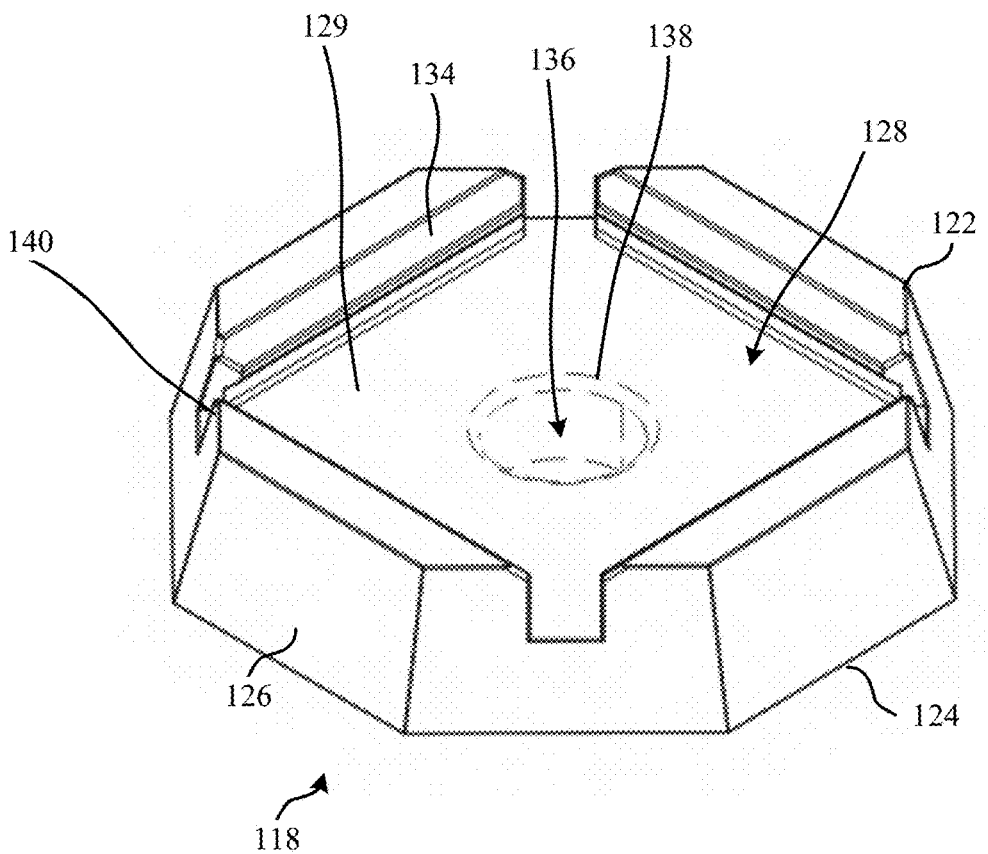
FIG. 5 is a perspective view of the jack pad of FIGS. 2, 3A, 3B, and 3C according to one aspect of the disclosure.
Figure 6:
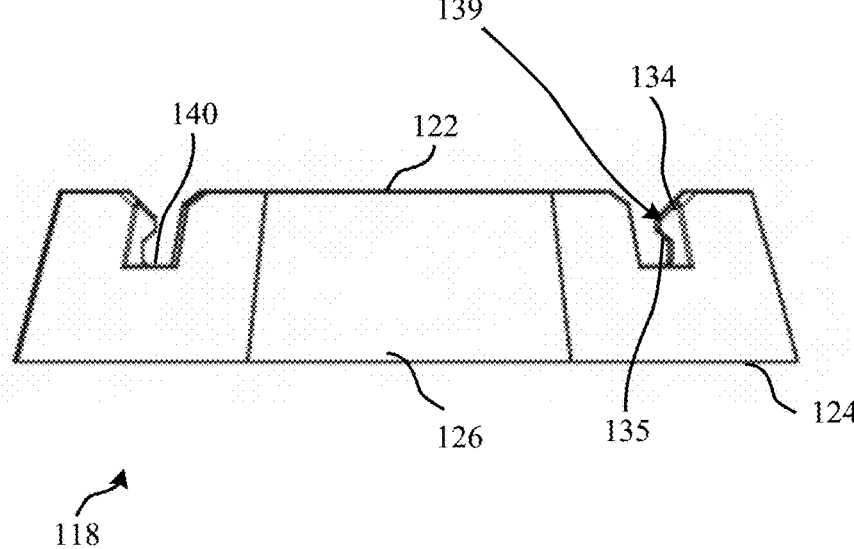
FIG. 6 is a side view of the jack pad of FIGS. 2, 3A, 3B, 3C, and 5 according to one aspect of the disclosure.

In one aspect, the body of the jack pad 118 defines an aperture 136 which in some aspects may receive and accommodate an attachment bolt or other attachment mechanism of the pad bracket 205 (not shown). In other aspects, the 136 may be provided for drainage and/or to assist with removal of the jack pad 118 from the pad bracket 205. The aperture 136 can be formed in the general configuration of an attachment bolt or mechanism or may be circular as shown in FIG. 5. While a circular shape is depicted, it will be appreciated by those skilled in the art that other shapes such as for example, oval, square, rectangular, and the like, are included within the scope of the disclosure. It is contemplated that the size, shape, and positioning of the aperture 136 for an aspect of the pad 118 may vary.

In one embodiment, the aperture 136 extends through the body of the jack pad 118 and can allow passage of the attachment bolt or mechanism and/or for the passage of water and/or liquid that may gather in the recess 128.

In one aspect, the pad 118 can be further adapted so as to incorporate include additional drainage features for drainage of water from the pad 118. During use, water may pool at the top of the pad bracket 205 as a result of wet conditions, such as rain. The drainage features can function to assist in the drainage of the pooled water from the pad 118 and/or pad bracket 205. In the aspect depicted in FIGS. 2-3C, 5, and 6, the drainage features may include plurality of channels 140 located at the side wall 126 of the pad 118. While four channels 140 are shown, it will be appreciated that the number and the location of the channels 140 can vary. In one aspect, for example, the pad 118 may comprise a single channel 140, while in further embodiments, the pad 118 can comprise a plurality of channels 140, such as six or more. As depicted, a channel 140 may positioned so as to be in substantially the same directional plane as an opposing channel 140 located on an opposite side wall 126. However, it will be appreciated that the positioning of the channels may be varied in alternate aspects. Further, the channel 140 can extend a distance from the upper surface 122 of the pad 118 through to the top, or approximately the top of the pad lip 139. It will be appreciated that the degree and the extent of the channel 140 extension may vary.

In operation, the pad 118 can be securely attached to the pad bracket 205 by snap-fit or press-fit. Attachment of the pad 118 and the pad bracket 205 can be achieved when the pad bracket 205 is placed on top of the pad 118, and pressure or weight is applied. The pad bracket 205 can be subsequently pressed into the recess 128 such that its peripheral edge 211 (FIG. 4) becomes trapped within the groove 132 under the lip 139 as the pad bracket 205 and pad 118 are forced together. The lip 139 can maintain the attachment of the pad 118 to the pad bracket 205 in a secure manner without the need for external fasteners.

Figure 2:
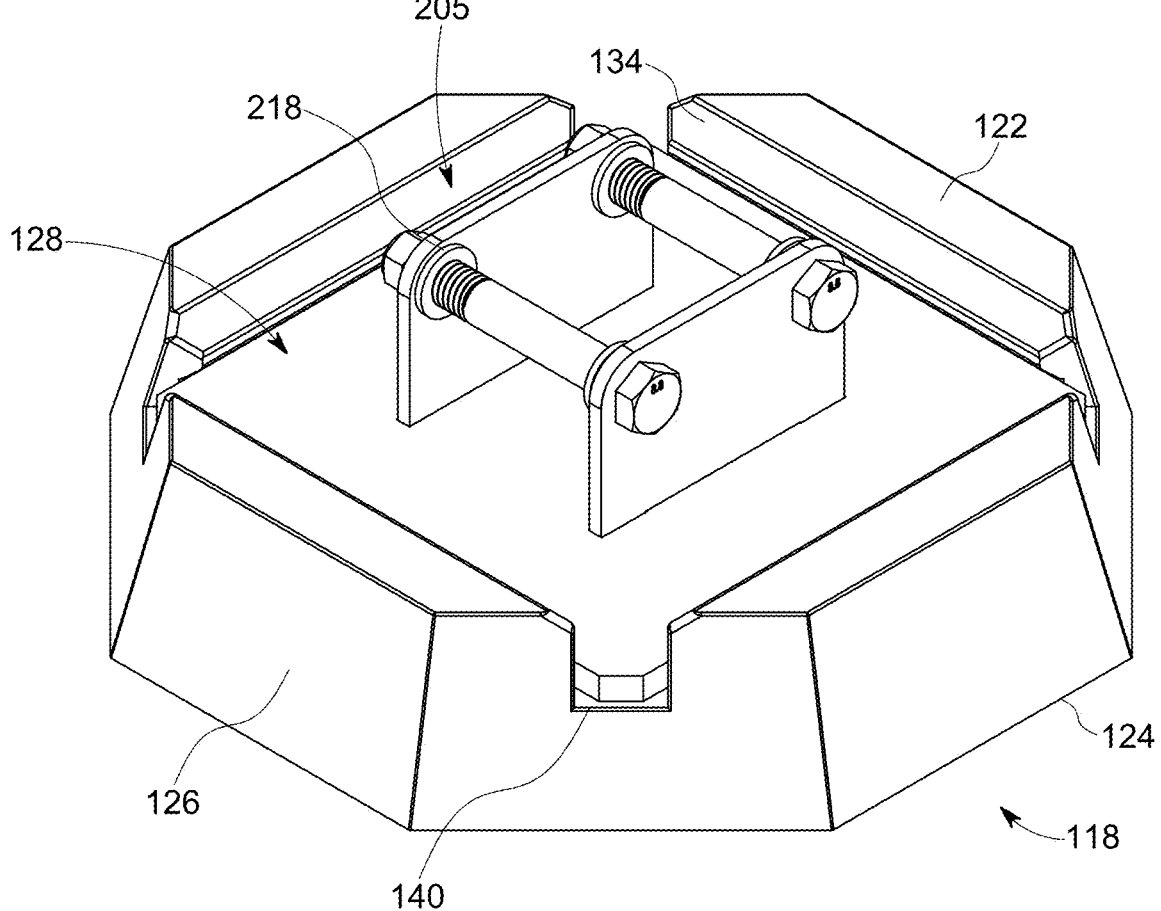
FIG. 2 is a perspective view of a jack pad and bracket according to one aspect of the disclosure.
Figure 3A:
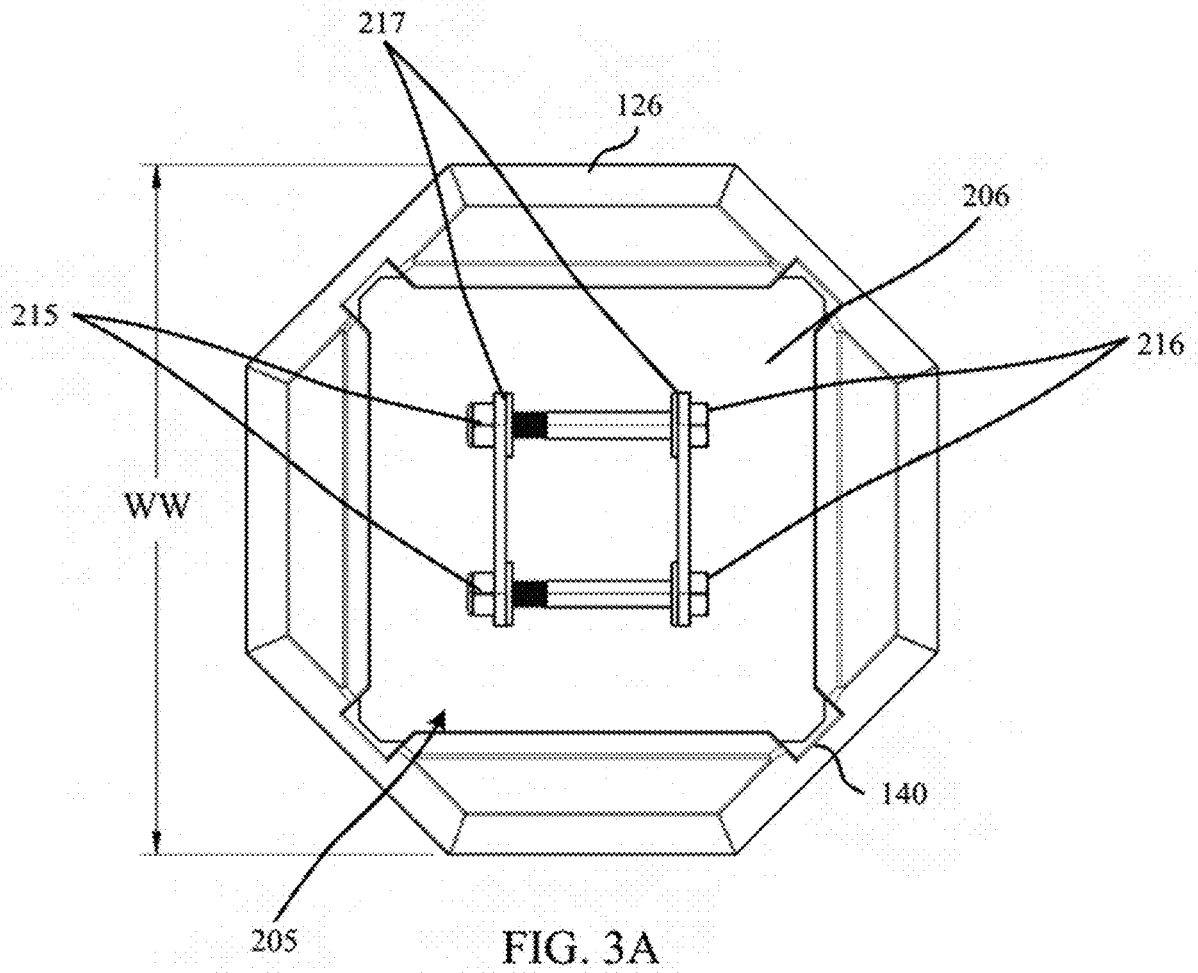
FIG. 3A is a top view of the jack pad and bracket of FIG. 2 according to one aspect of the disclosure.
Figure 4:
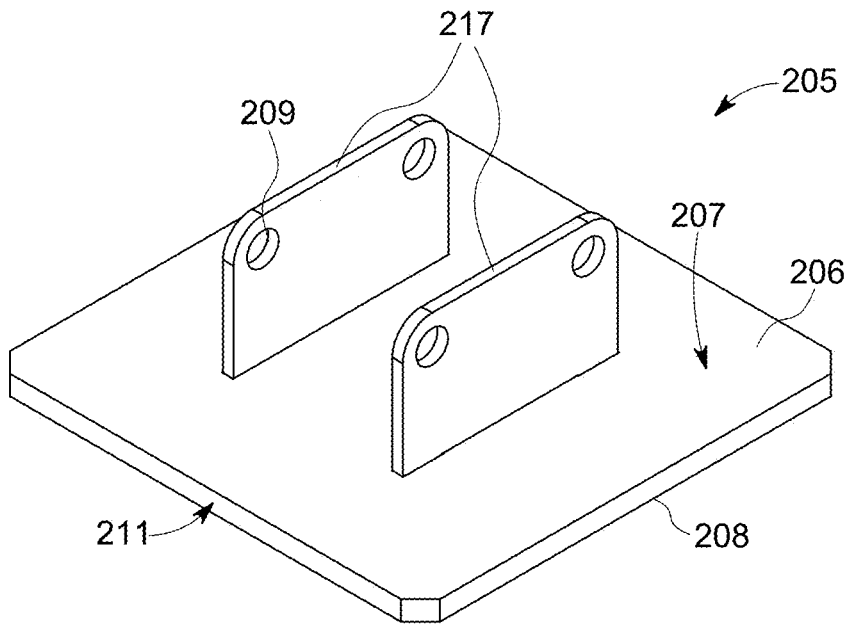
FIG. 4 is a perspective view of the bracket of FIGS. 2, 3A, 3B, and 3C according to one aspect of the disclosure.

As shown in FIGS. 2, and 3A, the pad bracket 205 may include a pad bracket interface portion 207 as shown in FIG. 4. The pad bracket interface portion 207 may be a plate with a bottom surface 208, a top surface 206 and a peripheral edge 211. The pad bracket 205 may have a series of tabs 217 that are configured to be connected to a jack (i.e., jack 100 in FIGS. 1A and 1B). To connect the tabs 217 to the jack 100, the bolts or fasteners 105 connecting two or more links 102a and/or 102b are removed and the jack base 104 is removed once the bolts or fasteners 105 are removed. Then, new fasteners may be installed to connect the two or more links 102a and/or 102b to the tabs 217. In one example, new bolts 216 with nuts 215 may be passed though the openings 209 (FIG. 4) and corresponding opening in the one or more links 102a and/or 102b. Then the nuts 215 may be threaded onto the bolts 216 to connect the two or more links 102a and/or 102b. In another example, the fasteners that were removed when removing the jack base 104 (FIG. 1A) may be reused when installing the pad bracket 205. In one example, washers, bushings, and/or spacers or other hardware may be installed between the tabs 217 and the corresponding connection points of the links 102a and/or 102b of the jack 100. Throughout the disclosure the terms washers, bushings and/or spacers may be used interchangeably. One example of spacers 218 is shown in FIG. 2. The spacers may have a portion that fits within the openings 209 and a portion that spaces the potential contact surface(s) of the links 102a and/or 102b from the tabs 217. By spacing the links 102a and/or 102b from the tabs 217, friction between the surfaces may be reduced which may prevent wear and protect the corresponding surfaces of the components. Further, reducing friction may prevent binding during operation of the jack 100.

The pad bracket 205 may be formed of a rigid or substantially rigid material. Materials that the pad bracket 205 can be formed from may include steel or other metals and may be powder coated or otherwise coated to prevent corrosion and to improve the appearance of the pad bracket 205. In some examples, the tabs 217 may be welded to the pad bracket interface portion 207. In other examples, the pad bracket 205 may be machined from a single billet of metal or as an alternative may be additively manufactured or 3D printed.

As noted above, the aforementioned bolts 216, nuts 215, the pad bracket 205 and the jack pad 118 may be a retrofit kit or system used to improve existing jacks installed onto the trailer and/or vehicle. In some examples, the spacers/bushings 218 may be included. In some examples the new bolts 216 and/or nuts 215 may be omitted and a user may instead re-use existing hardware from the jack 100. In any of the aforementioned examples any one or combination of the components disclosed herein may be packaged in a single kit or retrofit system that is sent to the user to be installed in the field. In some examples, the kit or retrofit system may include instructions included with the kit, printed on the packaging for example, and/or may include a link or QR code to digital content that provide installation instructions and/or video(s). In some examples, any one of or all the components may be sold separately as spare parts or as replacement parts.

FIG. 1B shows one example of the components described herein installed onto an existing jack 100. It is noted that in addition to a retrofit kit or system, the disclosed aspects may instead be part of a jack and sold or assembled as a jack with the jack pad 118 and the pad bracket 205 already installed.

As shown in FIG. 3A, the lower surface 124 of jack pad 118 (i.e., the portion that contacts the ground or other support surface), may have a lower surface width WW. The lower surface width WW may be from 5-12 inches. In another example WW may be from 6-9 inches. In a preferred aspect, WW may be approximately 8.117 inches.

Figure 3B:
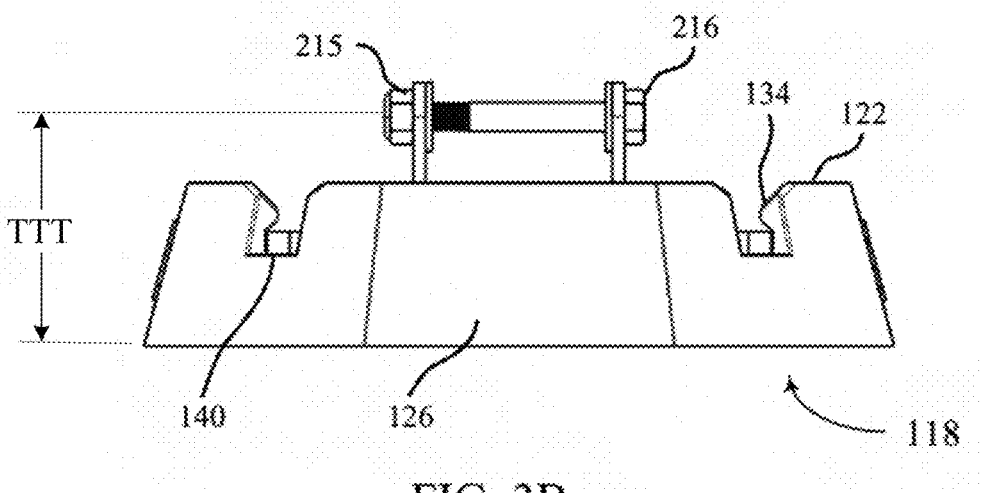
FIG. 3B is a first side view of the jack pad and bracket of FIGS. 2 and 3A according to one aspect of the disclosure.

As shown in in FIG. 3B, the jack pad 118 may have a jack pad to center of through bolt thickness TTT. The jack pad thickness TTT may be from 1-7 inches. In another example TTT may be from 1.75-4 inches. In a preferred aspect, TTT may be approximately 2.50 inches.

Figure 3C:
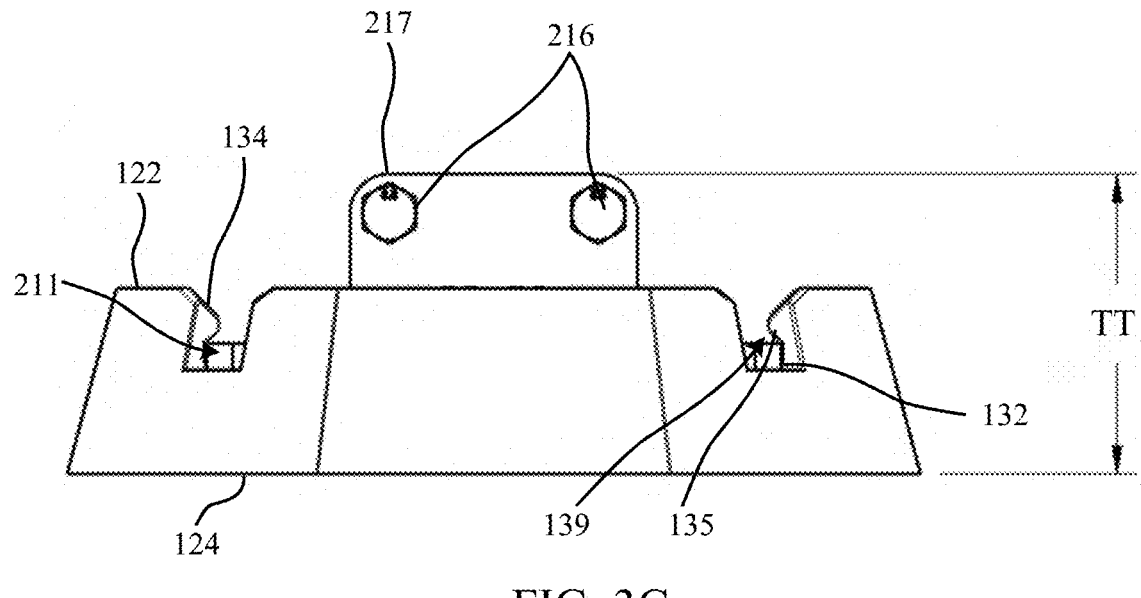
FIG. 3C is a second side view of the jack pad and bracket of FIGS. 2, 3A, and 3B according to one aspect of the disclosure.

As shown in in FIG. 3C, the jack pad 118 may have a jack pad and pad bracket thickness TT. The jack pad thickness TT may be from 1-7 inches. In another example TT may be from 1.75-4 inches. In a preferred aspect, TT may be approximately 2.875 inches.

It is noted that the dimensional ranges provided herein are solely provided as examples—the ranges or dimension are not intended to be limiting. The dimensions of the jack pad 118 and/or the pad bracket 205 may be increased or decreased as may be required to satisfy any design objectives; for example, the jack pad 118 may be made available in a variety of dimensions to correspond with different sizes and shapes of jacks. The jack pad 118 increases the footprint of the jack 100, particularly the surface contact patch to be greater than surface contact patch of a jack base 104. Increasing the footprint enhances the stability and reduces sinking the jack into a soft or uneven underlying support surface.

FIGS. 7-10 show additional aspects of the disclosure. It is noted that the features described with respect to FIGS. 7-10 may share features with, be substantially identical to, or may be analogous with the features and aspects described above with respect to FIGS. 1-6.

Similar to the aspects described above, features described herein are usable with a jack (e.g., such as jack 100 in FIGS. 1A and 1B). Like description of the jack of FIG. 1A and 1B will not be repeated here, however in one example, the jack pad 718 and pad bracket 805 described below may connect or otherwise be used to replace the jack base 104 as described above.

Figure 7:
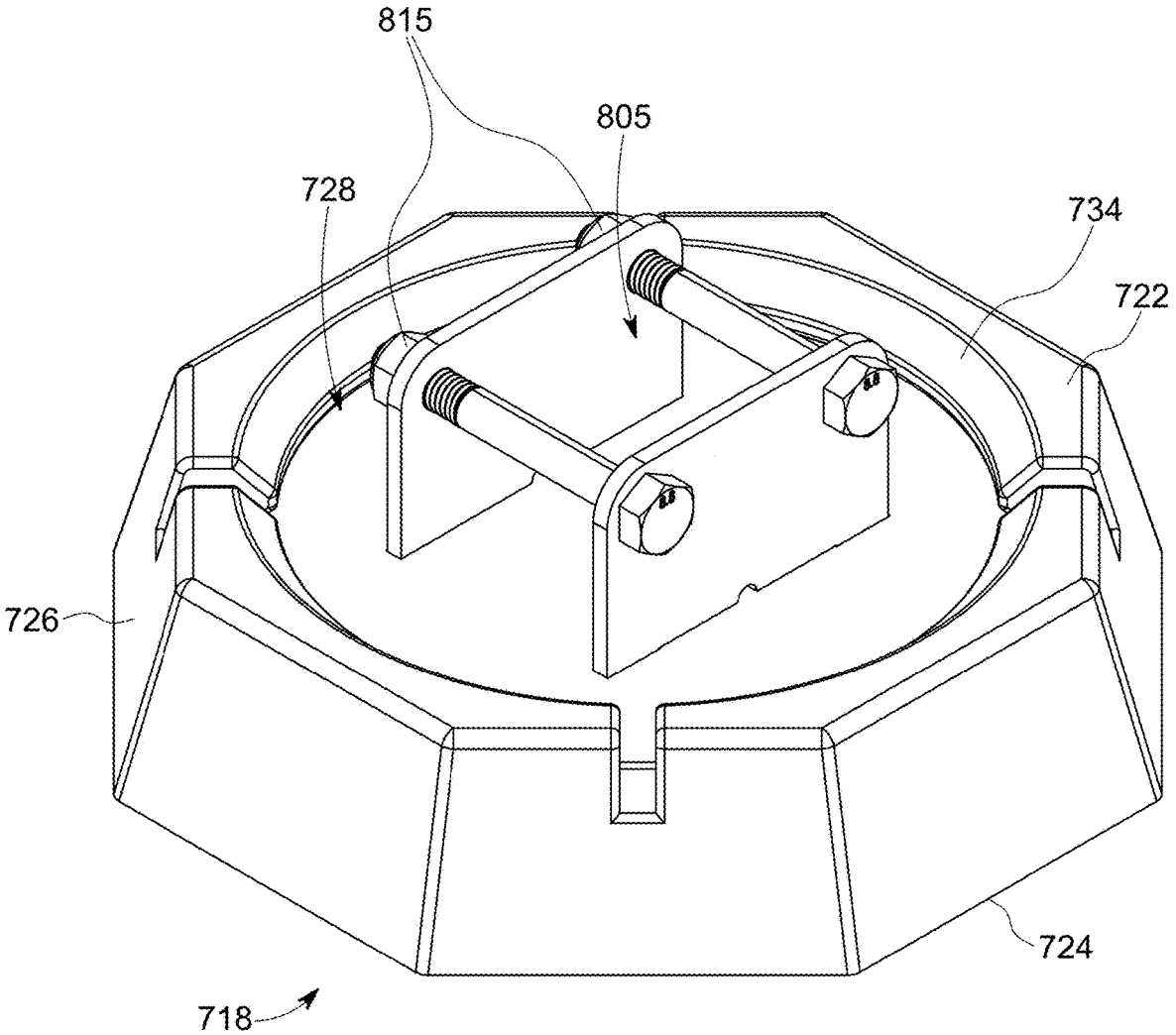
FIG. 7 is a perspective view of a jack pad and bracket according to one aspect of the disclosure.

FIG. 7 further illustrates a jack pad 718 and a jack pad bracket 805 according to aspects of the disclosure in an in-use position. As shown in FIG. 7, the jack pad 718 increases surface contact patch when compared to the jack base 104 (FIG. 1A) and isolates the pad bracket 805 from a ground or surface 55 (FIG. 1B). Further, as shown in FIG. 1A, when the jack base 104 is replaced with the pad bracket 805 and the jack pad 718 is installed thereon, the contact area with the surface 55 is increased which spreads the load that would typically be applied over a smaller contact area between the jack base 104 and the surface 55 over a much larger area. Further, the jack pad 718 may be formed of a flexible or semi-flexible material which provides cushioning and allows the jack pad 718 to conform to the surface 55, which stabilizes the vehicle load, especially on soft and/or uneven surfaces.

FIGS. 7, 8A, 8B, and 8C show examples of the jack pad 718 installed or otherwise engaged with a pad bracket 805. The jack pad 718 (which may hereinafter be interchangeably referred to simply as a "pad") is shown generally to comprise a body with an upper surface 722 and a lower surface 724 which are joined by a number of side walls (e.g., eight side walls 726).

The upper surface 722 is substantially flat to provide a relatively planar surface. The lower surface 724 is substantially flat to provide a relatively planar surface for the pad 718 to rest on any underlying support surface (e.g., support surface 55 in FIG. 1A).

In one aspect of the disclosure, the side walls 726 are arranged in a generally octagonal configuration. Compared to a round configuration, an octagonal configuration may have less deflection and greater stiffness to withstand a load received from a jack as further described below under the heading Test Example. While an octagonal configuration is depicted, it will be appreciated by those skilled in the art that other shapes such as for example, circular, oval, square, rectangular, hexagonal, heptagonal, nonagonal, decagonal, and the like, are included within the scope of the disclosure.

The body defines an inner recess 728 (FIGS. 7 and 10) for receiving and retaining at least part of the pad bracket 805. The recess 728 may be formed in the general configuration of the pad bracket 805 and/or a pad bracket interface portion 807 (FIG. 9) to provide a snug or secure fit. It is contemplated that the size, shape, and positioning of the recess 728 may vary. Such factors relating to the recess 728 can be dictated by the dimensions of the pad bracket 805 and particularly a portion of the pad bracket that interfaces with or otherwise interacts with the pad bracket (e.g., the bracket interface portion 807 in FIG. 9).

The recess 728 is shown as substantially circular or round and has a substantially flat or flat bottom surface 729 (FIG. 10) to receive and accommodate a similarly shaped pad bracket interface portion 807 of the pad bracket 805. For example, in some aspects, the pad bracket interface portion 807 may be a plate that is circular or rounded and thus the recess 728 may be similarly shaped so that the pad bracket interface portion 807 can fit therein. However, it will be appreciated by those skilled in the art that other shapes such as for example, oval, square, rectangular, octagonal, heptagonal, rectangular, and the like, are included within the scope of the disclosure.

In one aspect, the recess 728 can be positioned substantially in the center of the pad 718. The central positioning of the pad bracket 805 within the recess 728 can distribute loading, confer balance and stability, and prevent breakage or damage to the pad bracket 805.

In order to retain the pad bracket 805 within the recess 728, the edge 735 (FIG. 10) of the recess 728 may be angular and/or lipped. In one aspect, a vertically extending lip 739 grips a peripheral edge 811 (FIG. 9) of the pad bracket 805 upon insertion, resulting in a secure fit. When this fit occurs, the pad bracket 805 can be securely held within a groove 732 formed under the lip 739. The lip 739 can serve to retain the pad bracket 805 and can prevent relative movement between the pad bracket 805 and the pad 718.

In the aspects shown in FIGS. 7-8C, and 10, the edge of the recess 728 is angular to define an annular beveled or chamfered portion. The beveled portion comprises an inclined portion 734 (FIG. 10) which extends around the recess 728. In one aspect of the disclosure, the beveled portion can be formed by straightly cutting off a corresponding portion of the upper surface 722 so that the thickness of the material decreases gradually towards the center of the pad 718. In one aspect, the bevel angle (e.g., an angle formed by the inclined portion 734 and an extension of a plane forming part of the upper surface 722, can range from about 30 degrees to about 65 degrees. In one aspect of the disclosure, the bevel angle is about 45 degrees. The beveled portion (e.g., incline portion 734) widens the recess 728 to guide the pad bracket 805 into the pad 718 to avoid pinching the lip 739.

Figure 10:
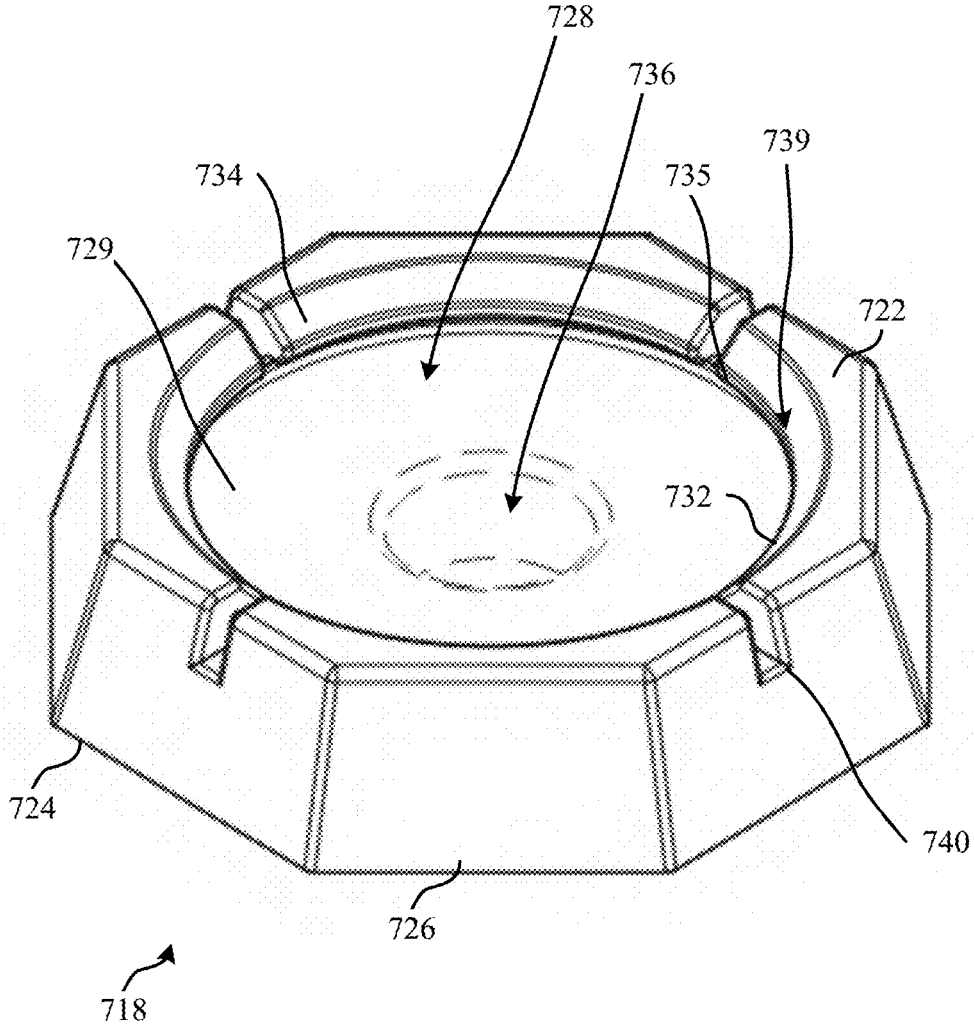
FIG. 10 is a perspective view of the jack pad of FIGS. 7, 8A, 8B, and 8C according to one aspect of the disclosure.

In one aspect disclosed herein, the body of the jack pad 718 defines an aperture 736 (FIG. 10) which in some aspects may receive and accommodate an attachment bolt or other attachment mechanism of the pad bracket 805 (not shown). In other aspects, the 736 may be provided for drainage and/or to assist with removal of the jack pad 718 from the pad bracket 805. The aperture 736 can be formed in the general configuration of an attachment bolt or mechanism or may be circular as shown in FIG. 10. While a circular shape is depicted, it will be appreciated by those skilled in the art that other shapes such as for example, oval, square, rectangular, and the like, are included within the scope of the disclosure. It is contemplated that the size, shape, and positioning of the aperture 736 for an aspect of the pad 718 may vary. In one aspect of the disclosure, the aperture 736 extends through the body of the jack pad 718 and can allow passage of the attachment bolt or mechanism and/or for the passage of water and/or liquid that may gather in the recess 728.

In one disclosed aspect, the pad 718 can be further adapted so as to incorporate include additional drainage features for drainage of water from the pad 718. During use, water may pool at the top of the pad bracket 805 as a result of wet conditions, such as rain. The drainage features can function to assist in the drainage of the pooled water from the pad 718 and/or pad bracket 805. In the aspects of the disclosure depicted in FIGS. 7-10, the drainage features may include plurality of channels 740 located at the side wall 726 of the pad 718. While four channels 740 are shown, it will be appreciated that the number and the location of the channels 740 can vary. In one aspect, for example, the pad 718 may comprise a single channel 740, while in further embodiments, the pad 718 can comprise a plurality of channels 740, such as to or more, potentially up to ten channels. As depicted, a channel 740 may positioned so as to be in substantially the same directional plane as an opposing channel 740 located on an opposite side wall 726. However, it will be appreciated that the positioning of the channels may be varied in alternate aspects. Further, the channel 740 can extend a distance from the upper surface 722 of the pad 718 through to the top, or approximately the top of the pad lip 739. It will be appreciated that the degree and the extent of the channel 740 extension may vary.

In operation, the pad 718 can be securely attached to the pad bracket 805 by snap-fit or press-fit. Attachment of the pad 718 and the pad bracket 805 can be achieved when the pad bracket 806 is placed on top of the pad 718, and pressure or weight is applied. The pad bracket 805 can be subsequently pressed into the recess 728 such that its peripheral edge 811 (FIG. 9) becomes trapped within the groove 732 under the lip 739 as the pad bracket 805 and pad 718 are forced together. The lip 739 can maintain the attachment of the pad 718 to the pad bracket 805 in a secure manner without the need for external fasteners.

As shown in FIGS. 7. 8A, and 9, the pad bracket 805 may include a pad bracket interface portion 807. The pad bracket interface portion 807 may be a plate with a bottom surface 808, a top surface 806 and a peripheral edge 811. The pad bracket 805 may have a series of tabs 817 that are configured to be connected to a jack (i.e., jack 100 in FIGS. 1A and 1B). To connect the tabs 817 to the jack 100, the bolts or fasteners 105 connecting two or more links 102a and/or 102b are removed and the jack base 104 is removed once the bolts or fasteners 105 are removed. Then, new fasteners may be installed to connect the two or more links 102a and/or 102b to the tabs 817. In one example, new bolts 816 with nuts 815 may be passed though the openings 809 (FIG. 9) and corresponding opening in the one or more links 102a and/or 102b. Then the nuts 815 may be threaded onto the bolts 816 to connect the two or more links 102a and/or 102b.

In another example, the fasteners that were removed when removing the jack base 104 (FIG. 1A) may be reused when installing the pad bracket 805. In one example, washers, bushings, and/or spacers or other hardware may be installed between the tabs 817 and the corresponding connection points of the links 102a and/or 102b of the jack 100. While not shown in FIGS. 7-9, one example of such spacers is shown and described with respect to spacers 218 is shown in FIG. 2. The spacers may have a portion that fits within the openings 809 and a portion that spaces the potential contact surface(s) of the links 102a and/or 102b from the tabs 817. By spacing the links 102a and/or 102b from the tabs 817, friction between the surfaces may be reduced which may prevent wear and protect the corresponding surfaces of the components. Further, reducing friction may prevent binding during operation of the jack 100.

The pad bracket 805 may be formed of a rigid or substantially rigid material. Example rigid or substantially rigid materials include steel or other metals and may be powder coated or otherwise coated to prevent corrosion and to improve the appearance of the pad bracket 805. In some examples, the tabs 817 may be welded to the pad bracket interface portion 807. In other examples, the pad bracket 805 may be machined from a single billet of metal or as an alternative may be additively manufactured or 3D printed.

As noted above, the aforementioned bolts 816, nuts 815, the pad bracket 805 and the jack pad 718 may be a retrofit kit or system used to improve existing jacks installed onto the trailer and/or vehicle. In some examples, the spacers (e.g., spacers/bushings 218 in FIG. 2) may be included. In some examples the new bolts 816 and/or nuts 815 may be omitted and a user may instead re-use existing hardware from the jack 100. In any of the aforementioned examples any one or combination of the components disclosed herein may be packaged (e.g., boxed, bagged, or otherwise held or kept together) in a single kit or retrofit system that is sent to the user to be installed in the field. In some examples, the kit or retrofit system may include instructions included as a pamphlet or sheet with the kit, printed on the packaging for example, and/or may include a link or QR code to digital content that provides installation instructions and/or video (s). In some examples, any one of or all the components may be sold separately as spare parts or as replacement parts.

FIG. 1B shows one example of the components described herein installed onto an existing jack 100. It is noted that in addition to a retrofit kit or system, the disclosed aspects may instead be part of a jack and sold or assembled as a jack with the jack pad 718 and the pad bracket 805 already installed.

Figures 8A, 8B:
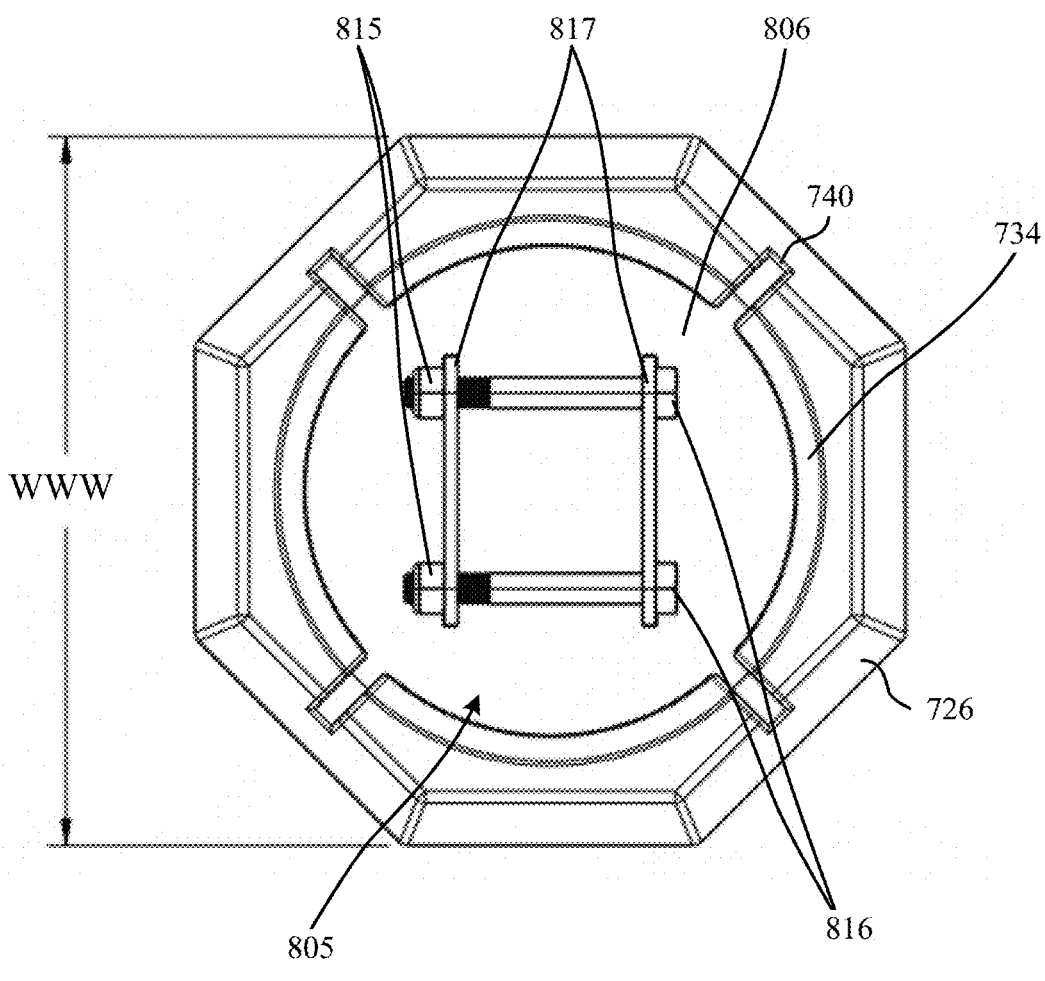
FIG. 8A is a top view of the jack pad and bracket of FIG. 7 according to one aspect of the disclosure.
FIG. 8B is a first side view of the jack pad and bracket of FIGS. 7 and 8A according to one aspect of the disclosure.

As shown in FIG. 8A, the lower surface 724 of jack pad 718 (i.e., the portion that contacts the ground or other support surface), may have a lower surface width WWW. The lower surface width WWW may be from 5-12 inches. In another example WWW may be from 6-9 inches. In a preferred aspect, WW may be approximately 7.25 inches.

As shown in in FIG. 8B, the jack pad 718 may have a jack pad to center of through bolt thickness TTT. The jack pad thickness TTT may be from 1-7 inches. In another example TTT may be from 1.75-4 inches. In a preferred aspect, TTT may be approximately 2.4375 inches.

Figure 8C:
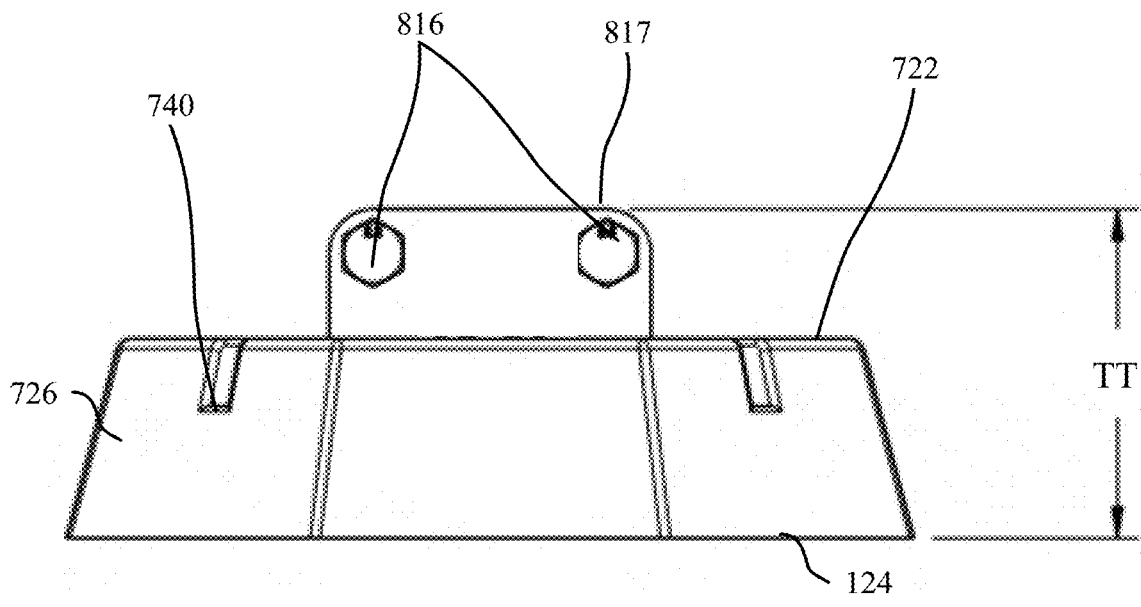
FIG. 8C is a second side view of the jack pad and bracket of FIGS. 7, 8A, and 8B according to one aspect of the disclosure.
Figure 9:
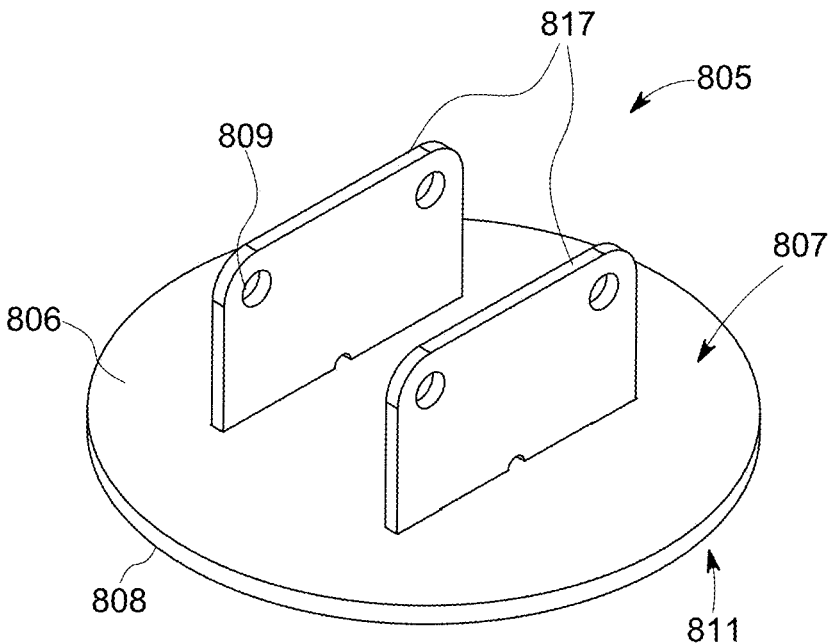
FIG. 9 is a perspective view of the bracket of FIGS. 7, 8A, 8B, and 8C according to one aspect of the disclosure.

As shown in in FIG. 8C, the jack pad 718 may have a jack pad and pad bracket thickness TT. The jack pad thickness TT may be from 1-7 inches. In another example TT may be from 1.75-4 inches. In a preferred aspect, TT may be approximately 2.8125 inches.

It is noted that the dimensional ranges provided herein are solely provided as examples—the ranges or dimension are not intended to be limiting. The dimensions of the jack pad 718 and/or the pad bracket 805 may be increased or decreased as may be required to satisfy any design objectives; for example, the jack pad 718 may be made available in a variety of dimensions to correspond with different sizes and shapes of jacks. The jack pad 718 increases the footprint of the jack 100, particularly the surface contact patch to be greater than surface contact patch of a jack base 104. Increasing the footprint enhances the stability and reduces sinking the jack into a soft or uneven underlying support surface.

It will be understood by those skilled in the art that if desired, the pads 118 and/or 718 described above can be permanently attached to the pad bracket 205 and/or 805 if the pad 118 and/or 718 are to be used regularly. In one aspect, one or more adhesives may be used to attach the pad 118 and/or 718 permanently to the pad bracket 205 and/or 805. Suitable adhesives may include, but are not limited to, liquid adhesives, glues, two-sided tape, and the like. In one aspect, at least two layers of adhesives and a barrier layer are used. The first adhesive layer can adhere to the material of the jack pad 118 and/or 718, while the second adhesive layer can adhere the material of the pad bracket 205 and/or 805. The barrier layer is formed of a material such as, for example, plastic, which can adhere to both adhesive layers.

In one example use of the aforementioned jack pad 118 and/or 718 and pad bracket 205 and/or 805 installed on a jack, a vehicle can be driven to the desired site, such as for example, a designated campground site, storage site, etc., and maneuvered into position on the support surface, such as for example, the ground. Once the vehicle is at the desired location, the vehicle jack may be lowered manually, using control panel within the vehicle, and/or via electric or automated controls at the vehicle jack. The user may then extend the jack, pad bracket 205 and/or 805, and jack pad 118 and/or 718 to the ground with the assurance that the pad 118 and/or 718 is properly secured and positioned under the jack when the jack is lowered to the ground. Upon further lowering of the jack, pad bracket 205 and/or 805, and jack pad 118 and/or 718 the vehicle can be raised upwardly to a desired height from the ground. Typically, the vehicle has a plurality of jacks which can be adjusted to level and stabilize the vehicle accordingly. Since the pad 118 and/or 718 is flexible, it may conform to uneven ground. When a user wishes to move the vehicle again, user can retract the jack, pad bracket 205 and/or 805, and jack pad 118 and/or 718 from the ground, thereby allowing the vehicle to depart from the camp site.

It will be appreciated that the jack pad 118 and/or 718 of the present disclosure may be simple in design but rugged in construction, such that it can be made at low cost. The upper surface 122 and/or 722, lower surface 124 and/or 724, side wall 126 and/or 726, recess 128 and/or 728, and/or aperture 136 and/or 736 can be integral in construction such that the jack pad 118 and/or 718 can be formed (i.e., via shaping or additive manufacturing techniques), molded, and/or machined as a single component.

The jack pad 118 and/or 718 can be constructed from any material or combination of materials having suitable properties such as, for example, mechanical strength, ability to withstand heat, cold, moisture, and adverse conditions, and ease of manufacture. In one embodiment, the jack pad 118 and/or 718 may be constructed from a flexible, elastic material having sufficient strength and ruggedness to support the weight and withstand use, to increase resistance of the jack pad 118 and/or 718 to slip, and to conform to uneven underlying support surfaces.

As used herein, the term "flexible" means capable of bending without breaking. As used herein, the term "elastomer" means a material which exhibits the property of elasticity, namely the ability to deform when a stress is applied and to recover its original form (i.e., length, volume, shape, etc.) spontaneously when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable elastomeric materials may include, but are not limited to, high friction, low tack materials such as, for example, crumb rubber, natural rubber, plastic materials, elastomerics, and the like. Such materials are durable, lightweight, and relatively inexpensive.

In one aspect, the jack pad 118 and/or 718 is formed of crumb rubber. Crumb rubber is recycled rubber from automotive and truck scrap tires; thus, the jack pad 118 and/or 718 formed from crumb rubber is flexible, durable, strong, and environmentally friendly.

The jack pad 118 and/or 718 may be fabricated by a molding process including, but not limited to, injection molding and/or compression molding, or other processes known in the art. In one aspect, the jack pad 118 and/or 718 may be cast or molded as a single piece. In one embodiment, the jack pad 118 and/or 718 may be formed of a material which readily enables indicia to be embossed on the side walls 126 and/or 718, or the upper or lower surfaces (122, 124, 722, 724); for example, indicia on the lower surface 124 and/or 724 may include instructions for use of the jack pad 118 and/or 718.

In one aspect, the jack pad 118 and/or 718 and the pad bracket 205 and/or 805 may be permanently connected or formed, machined, molded, or additively manufactured as a single piece or component.

Example aspects of the present disclosure are described in the following Test Example, which is set forth to aid in the understanding of the disclosure and should not be construed to limit in any way the scope of the disclosure as defined in the claims which follow thereafter.

IV. Test Example

Computer simulations were conducted to compare the deflection of round and octagonal shaped pads. Deflection is the degree to which a structural element is displaced under a load. The test load was 5000 lbs+. The simulations were based on various pressure points on the bottom of the pads. Three simulations for the round pad yielded deflections of 0.125, 0.127, and 0.206. One simulation for the octagonal pad yielded a deflection of 0.088. These results indicate that the octagonal shaped pad deflected less and exhibited greater stiffness compared to the round pad.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A jack pad system for connection to a jack, the jack pad system comprising:
   a substantially rigid pad bracket;
   a jack pad formed of a flexible or elastic material and configured to engageably connect to the pad bracket, the jack pad comprising a body having an upper surface and a lower surface joined by side walls and defining a recess for retaining a portion of the pad bracket, wherein the jack pad further comprises a plurality of channels, wherein each of the plurality of channels extends from the upper surface to a recess surface of the recess;
   the pad bracket having at least four corners that correspond with the plurality of channels.

2. The system of claim 1, wherein the pad bracket connects to the jack pad via a pad bracket interface portion, wherein the lower surface of the jack pad has a greater surface area than the pad bracket interface portion.

3. The system of claim 2, wherein the pad bracket interface portion is a plate configured to fit within the recess of the jack pad.

4. The system of claim 2, wherein the jack pad further comprises a retaining lip for securing the pad bracket interface portion, the lip including a vertically extending lip configured for gripping a peripheral edge of the pad bracket interface portion in a groove formed under the lip upon insertion of the pad bracket interface portion into the recess.

5. The system of claim 2, wherein the plurality of channels are drainage portions connected to the recess for allowing drainage of water from the jack pad and the bracket interface portion.

6. The system of claim 1, wherein the recess is in a center of the jack pad.

7. The system of claim 1, wherein the side walls of the jack pad are arranged in an octagonal configuration.

8. The system of claim 1, further comprising an aperture extending through the body of the jack pad.

9. The system of claim 1, wherein the upper surface and lower surface are substantially flat to provide relatively planar surfaces.

10. The system of claim 9, wherein the side walls are oblique with respect to the upper surface and the lower surface.

11. The system of claim 1, wherein the flexible or elastic material comprises an elastomeric, rubber, a crumb rubber, resin, or combinations thereof.

12. The system of claim 1, wherein the pad bracket comprises one or more connection interfaces for connecting the pad bracket to a jack.

13. A vehicle jack pad bracket configured to be mounted to a jack and engageably connected to a jack pad, the jack pad bracket comprising:
   a substantially rigid pad bracket configured to connect to a plurality of jack links, wherein the pad bracket comprises two or more tabs with through holes for mounting the jack to the pad bracket; and
   a pad bracket interface portion, wherein the pad bracket interface portion engageably connects the jack pad by being received within a recess of the jack pad, the pad bracket having at least four corners that correspond with drainage channel openings at side walls of the jack pad.

14. The jack pad bracket of claim 13, wherein the pad bracket interface portion is a plate-shaped and configured to fit within the recess of the jack pad.

15. The jack pad bracket of claim 14, wherein the plate-shaped portion of the pad bracket interface is configured to be retained within the recess of the pad bracket by a retaining lip of the jack pad when the pad bracket interface portion is pressed into the recess so that a peripheral edge of the pad bracket interface portion is gripped by a lip and retained within in a groove formed under the lip of the jack pad.

16. The jack pad bracket of claim 15, wherein the pad bracket interface portion is one of a square, a rectangle, or a circle.

17. The jack pad bracket of claim 13, wherein the two or more tabs are configured to have bolts passed therethrough for connecting the jack pad bracket to the jack.

* * * * *